US012741592B2

(12) United States Patent
Deng et al.

(10) Patent No.: US 12,741,592 B2
(45) Date of Patent: Sep. 22, 2026

(54) DRIVING ASSISTANCE SYSTEM AND VEHICLE

(71) Applicant: ArcSoft Corporation Limited, Hangzhou (CN)

(72) Inventors: Hui Deng, Hangzhou (CN); Feng Chen, Hangzhou (CN)

(73) Assignee: ArcSoft Corporation Limited, Hangzhou (CN)

( * ) Notice: Subject to any disclaimer, the term of this patent is extended or adjusted under 35 U.S.C. 154(b) by 85 days.

(21) Appl. No.: 18/579,465

(22) PCT Filed: Jul. 12, 2022

(86) PCT No.: PCT/CN2022/105247
§ 371 (c)(1),
(2) Date: Jan. 15, 2024

(87) PCT Pub. No.: WO2023/284748
PCT Pub. Date: Jan. 19, 2023

(65) Prior Publication Data

US 2024/0336197 A1 Oct. 10, 2024

(30) Foreign Application Priority Data

Jul. 13, 2021 (CN) ......................... 202110791987.3

(51) Int. Cl.
*B60R 1/22* (2022.01)
*G06V 20/58* (2022.01)
*H04N 7/18* (2006.01)

(52) U.S. Cl.
CPC ................ *B60R 1/22* (2022.01); *G06V 20/58* (2022.01); *H04N 7/181* (2013.01); *H04N 7/188* (2013.01);

(Continued)

(58) Field of Classification Search
CPC ................ B60R 1/22; B60R 2300/105; B60R 2300/802; G06V 20/58; H04N 7/181; H04N 7/188

(Continued)

(56) References Cited

U.S. PATENT DOCUMENTS 9,947,228 B1 * 4/2018 Kim ......................... G08G 1/04
10,969,237 B1 * 4/2021 Zhang ................ G01C 21/3602

(Continued)

FOREIGN PATENT DOCUMENTS

CN 108058706 A 5/2018
CN 109624850 A 4/2019

(Continued)

OTHER PUBLICATIONS

International Search Report issued in International Application No. PCT/CN2022/105247 mailed on Oct. 21, 2022 (6 pages).

(Continued)

*Primary Examiner* — Asmamaw G Tarko
(74) *Attorney, Agent, or Firm* — Osha Bergman Watanabe & Burton LLP

(57) ABSTRACT

A driving assistance system includes a vehicle attitude detection unit, camera units, a processing unit, and a display unit. The vehicle attitude detection unit detects a driving state of the vehicle in real time after the vehicle is started and obtain a vehicle attitude detection signal. The processing unit has a first interface, a second interface, and a third interface. The processing unit is connected to the vehicle attitude detection unit through the first interface and is configured to receive the vehicle attitude detection signal outputted by the vehicle attitude detection unit and receive, through the second interface, image data obtained by the camera unit corresponding to the vehicle attitude detection signal. The display unit is connected to the third interface of (Continued)

the processing unit and is configured to receive and display the image data.

20 Claims, 2 Drawing Sheets

(52) U.S. Cl.
CPC ... *B60R 2300/105* (2013.01); *B60R 2300/802* (2013.01)

(58) Field of Classification Search
USPC ................. 348/148, 118, 159; 382/104, 103; 701/23
See application file for complete search history.

(56) References Cited

U.S. PATENT DOCUMENTS

2014/0211319 A1 7/2014 Park et al.
2017/0371353 A1* 12/2017 Millinger, III .......... G06T 7/246
2019/0258251 A1* 8/2019 Ditty .................... G05D 1/0274
2020/0278743 A1* 9/2020 Hiroki ..................... G06F 3/011
2023/0162464 A1* 5/2023 Kondiparthi .............. G06T 7/70 382/156
2023/0319218 A1* 10/2023 Ren ....................... G06T 3/4038 382/284
2024/0424988 A1* 12/2024 Burns ....................... B60R 1/27
2024/0426623 A1* 12/2024 Gamalath .......... G01C 21/3602

FOREIGN PATENT DOCUMENTS

CN 110967038 A 4/2020
CN 111587407 A 8/2020
CN 113386669 A 9/2021
CN 216184804 U 4/2022

OTHER PUBLICATIONS

Written Opinion issued in International Application No. PCT/CN2022/105247 mailed on Oct. 21, 2022 (4 pages).
European Extended Search Report issued in Application No. 22841382.9 mailed on Jun. 24, 2025 (9 pages).

* cited by examiner

DRIVING ASSISTANCE SYSTEM AND VEHICLE

This application claims priority to Chinese Patent Application No. 202110791987.3, filed on Jul. 13, 2021, and PCT Application No. PCT/CN2022/105247, filed on Jul. 12, 2022, the entire contents of which are incorporated by reference.

TECHNICAL FIELD

The present disclosure relates to driving assistance technologies, specifically to a driving assistance system and a vehicle.

BACKGROUND

Due to the structure of a vehicle and the driving environment, a driver has various blind zones in sight line and cannot see all situations around a vehicle body. Therefore, in a reversing or parking scenario, cameras or radars are usually used to display and detect the surrounding environment, to assist in the driving behavior of the driver.

There are some blind zones in sight line on some roads with steep uphills or downhills or in the case of turning, which is very detrimental to driving safety. In an existing solution for detection by using an ultrasonic radar, a plurality of ultrasonic sensors are mounted outside a vehicle body, objects around the vehicle are detected by returned signals after signals emitted by the radars contact the objects, and a driver is alerted by some alarm sounds. However, such a solution can only detect whether the objects exist and reflect distance information of the objects without real-time images, and cannot fully reflect the real environment outside the vehicle and determine what the specific objects are.

Therefore, it is necessary to propose a driving assistance technology, which can automatically display images obtained by relevant cameras based on a driving attitude of the vehicle, to implement monitoring of blind zones in sight line.

SUMMARY

Embodiments of the present disclosure provide a driving assistance system and a vehicle, to solve at least the technical problem in the prior art that images obtained by relevant cameras cannot be automatically displayed based on a driving attitude of the vehicle.

According to one aspect of the embodiments of the present disclosure, a driving assistance system is provided, including a vehicle attitude detection unit, camera units, a processing unit, and a display unit, where the vehicle attitude detection unit is configured to detect a driving state of a vehicle in real time after the vehicle is started and obtain a vehicle attitude detection signal; the processing unit has a first interface, a second interface, and a third interface; the processing unit is connected to the vehicle attitude detection unit through the first interface and is configured to receive the vehicle attitude detection signal outputted by the vehicle attitude detection unit and receive, through the second interface, image data obtained by the camera units corresponding to the vehicle attitude detection signal; and the display unit is connected to the third interface of the processing unit and is configured to receive and display the image data.

Optionally, the processing unit further includes a fourth interface and is configured to generate an enabling signal based on the vehicle attitude detection signal, send the enabling signal to the camera units through the fourth interface, and control the camera units to be enabled.

Optionally, the driving assistance system further includes a blind zone detection unit configured to determine a blind zone position of the vehicle in light of the vehicle attitude detection signal and obtain a blind zone detection signal; and the processing unit determines the blind zone position based on the blind zone detection signal and receives, through the second interface, image data corresponding to the blind zone position and obtained by the camera units.

Optionally, the vehicle attitude detection signal includes at least one of: a vertical angle, a horizontal angle, or a driving speed of the vehicle.

Optionally, the processing unit is further configured to compare the vehicle attitude detection signal with a preset value and receive the image data obtained by the camera units corresponding to the vehicle attitude detection signal based on a comparison result.

Optionally, the vehicle attitude detection unit, the processing unit, the camera units, and the display unit are discrete components, partially integrated components, or completely integrated components.

Optionally, the processing unit further renders the image data and sends the processed image data to the display unit through the third interface for display.

Optionally, the camera units are located on at least one of following positions of the vehicle: a front side, a rear side, a left side, or a right side.

Optionally, the processing unit synthesizes image data obtained by the camera units in at least two adjacent positions.

Optionally, the vehicle attitude detection signal represents at least one of following driving states of the vehicle: straight driving, uphill driving, downhill driving, left turning, right turning, reversing, or parked.

Optionally, the driving assistance system further includes a sight line detection unit configured to detect a sight line direction and/or a sight point position of a driver and obtain a sight line detection signal; and the processing unit generates a display unit enabling signal based on the sight line detection signal and controls the display unit to be enabled.

Optionally, the vehicle attitude detection unit includes at least one of: an inertial sensor, a camera, an infrared sensor, a radar, a laser radar, or a GPS.

Optionally, the inertial sensor includes a three-axis gyroscope, a three-axis accelerometer, and a three-axis magnetometer.

Optionally, the processing unit detects an obstacle in the image data to obtain an obstacle detection result.

Optionally, the obstacle detection result is transmitted to the display unit for display or is transmitted to an alarm apparatus for alert.

Optionally, content displayed by the display unit contains a distance and a direction indication.

Optionally, a number of the camera units is at least four, such that environmental images covering a periphery of the vehicle can be obtained when enabling all the camera units.

Optionally, a field of view of the camera units is greater than or equal to 180 degrees.

According to another aspect of the embodiments of the present disclosure, a vehicle is provided, including any one of the above driving assistance systems.

BRIEF DESCRIPTION OF THE DRAWINGS

The accompanying drawings described herein are used to provide a further understanding of the present disclosure, and constitute a part of the present application. The schematic embodiments of the present disclosure and their descriptions are used to explain the present disclosure, and do not constitute improper limitations to the present disclosure. In the drawings.

DETAILED DESCRIPTION

To make those skilled in the art better understand the solutions of the present disclosure, the technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the scope of protection of the present disclosure.

It should be noted that the terms "first", "second", etc. in the specification and claims of the present disclosure and the above accompanying drawings are used to distinguish similar objects and are not necessarily used to describe a particular order or sequence. It is to be understood that the sequences used in this way may be interchanged under appropriate circumstances, such that the embodiments of the present disclosure described herein can be implemented in sequences other than those illustrated or described herein. In addition, the terms "include/comprise", "have/has", and any variations thereof are intended to cover non-exclusive inclusion. For example, processes, methods, systems, products, or devices including a series of steps or units are not necessarily limited to explicitly listed steps or units, but may include steps or units not explicitly listed, or other steps or units inherent to these processes, methods, products, or devices.

If it is mentioned that a certain structural element is "connected" to or "in contact with" another structural element, it may be directly connected to or in contact with that other structural element, but it may be also understood that there are other structural elements between them. Conversely, if it is mentioned that a certain structural element is "directly connected to" or "in direct contact with" another structural element, it is to be understood that there are no other structural elements between them.

Figure 1:
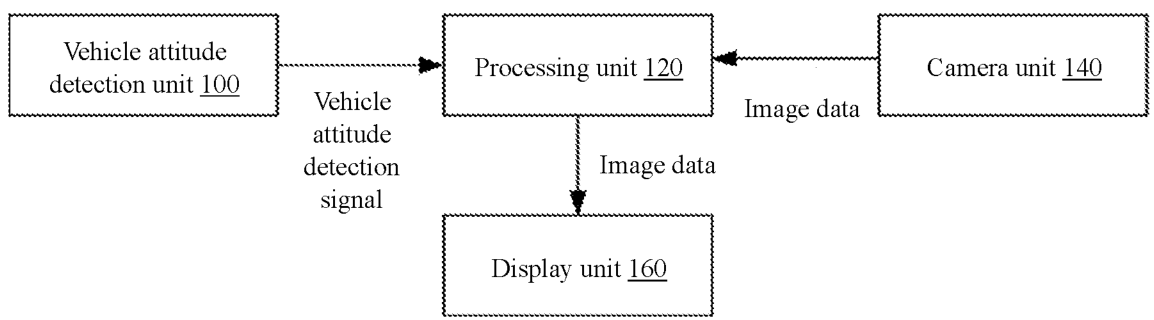
FIG. 1 is a structure block diagram of an optional driving assistance system according to an embodiment of the present disclosure.

Reference is made to FIG. 1, which is a structure block diagram of an optional driving assistance system according to an embodiment of the present disclosure. As shown in FIG. 1, the driving assistance system 10 includes a vehicle attitude detection unit 100, a processing unit 120, camera units 140, and a display unit 160, where the vehicle attitude detection unit 100 is configured to detect a driving state of a vehicle in real time after the vehicle is started and obtain a vehicle attitude detection signal.

In an optional embodiment, the vehicle attitude detection signal includes information such as a vertical angle, a horizontal angle, and a driving speed of the vehicle. The driving state of the vehicle includes at least one of the following: straight driving, uphill driving, downhill driving, left turning, right turning, reversing, or parked. For example, the vertical angle information contained in the vehicle attitude detection signal may represent whether the vehicle is in the normal straight driving state, the uphill driving state, or the downhill driving state. The horizontal angle information contained in the vehicle attitude detection signal may represent whether the vehicle is in the straight driving state, the reversing state, the left turning state, or the right turning state. The driving speed contained in the vehicle attitude detection signal may represent whether the vehicle is in the parked state. Combining the vertical angle information and the horizontal angle information simultaneously, the uphill driving may be divided into straight uphill driving, left-turn uphill driving, and right-turn uphill driving, the downhill driving may be divided into straight downhill driving, left-turn downhill driving, and right-turn downhill driving, and the reversing may be divided into different states such as straight reversing, left-side reversing, right-side reversing, uphill reversing, and downhill reversing.

The vehicle attitude detection unit includes at least one of the following: an inertial sensor, a camera, an infrared sensor, a radar, a laser radar, or a GPS. In a specific embodiment, the vehicle attitude detection unit is an inertial sensor including a three-axis gyroscope, a three-axis accelerometer, and a three-axis magnetometer.

The processing unit 120 has a first interface, a second interface, and a third interface, where the processing unit is connected to the vehicle attitude detection unit 100 through the first interface and is configured to receive the vehicle attitude detection signal outputted by the vehicle attitude detection unit 100 and receive, through the second interface, image data obtained by the camera units 140 corresponding to the vehicle attitude detection signal.

In an optional embodiment, the camera units 140 are located on at least one of the following positions of the vehicle: a front side, a rear side, a left side, or a right side. Specifically, the camera units 140 may be mounted in any areas of a vehicle body such as an engine hood, a front windshield, a front bumper, a rear windshield, a trunk lid, a rear bumper, a vehicle door, a fender, and a side mirror, and are configured to obtain image data in different directions such as the front side, the rear side, the left side, and the right side. There are at least four camera units 140, for example, a 360 surround view monitoring (SVM) system is composed of four to six cameras, such that environmental images covering a periphery of the vehicle can be obtained in the case of enabling all the camera units. If images obtained by the camera units 140 need to be panoramically stitched, a field of view of each camera unit 140 may be selected to be greater than or equal to 180 degrees.

In an optional embodiment, the processing unit 120 is connected to the vehicle attitude detection unit 100, the camera units 140, and the display unit 160 in a wired manner such as a video cable or a data cable, or in a wireless manner.

In an optional embodiment, the processing unit is further configured to compare the vehicle attitude detection signal with a preset value and receive the image data obtained by the camera units 140 corresponding to the vehicle attitude detection signal based on a comparison result. For example, when the vehicle attitude detection signal represents that the vehicle is in the uphill driving state or the downhill driving state, if the vertical angle information in the vehicle attitude detection signal exceeds a preset value, the processing unit obtains an image in front of the vehicle. When the vehicle attitude detection signal represents that the vehicle is in the left turning state or the right turning state, if the horizontal angle information in the vehicle attitude detection signal exceeds a preset value, the processing unit obtains an image on the left side or the right side of the vehicle.

The display unit 160 is connected to the third interface of the processing unit 120 and is configured to receive and display the image data.

In an optional embodiment, content displayed by the display unit may be image data obtained by a single camera unit or may be formed by stitching image data obtained by a plurality of camera units. A user may select whether to display image data obtained by a single camera or image data stitched from the plurality of camera units on the display unit. A display mode may be 2D display with an angle of top view, front view, side view, rear view, etc., or 3D display with an arbitrarily adjustable angle. The content displayed by the display unit may further include a distance and a direction indication. When the displayed content is a 3D image, the processing unit 120 renders the obtained image data and sends the processed 3D image data to the display unit through the third interface for display.

The above driving assistance system can detect the driving state of the vehicle in real time, automatically obtain the image data from the camera units in the corresponding positions based on the driving state, and display the image data on the display unit, thereby ensuring driving safety of a driver. For example, when the driving assistance system detects that the driving state of the vehicle is uphill driving, an image on an uphill road is automatically obtained through a front view camera and displayed. When it is detected that the driving state of the vehicle is downhill driving, an image on a downhill road is automatically obtained through the front view camera and displayed. When it is detected that the driving state of the vehicle is left turning, an image of a left side environment is automatically obtained through a camera on the left side of the vehicle and displayed. When it is detected that the driving state of the vehicle is right turning, an image of a right side environment is automatically obtained through a camera on the right side of the vehicle and displayed. When it is detected that the driving state of the vehicle is reversing, an image of a rear side environment is automatically obtained through a rear view camera of the vehicle and displayed. Thus, the driver can promptly see a surrounding environment in a moving direction of the vehicle without being triggered by a signal such as a turn signal, and accidents can be reduced.

In an optional embodiment, the processing unit may further process the image data and sends the processed image data to the display unit through the third interface for display. A processing method includes distortion correction, noise reduction, calibration, color enhancement, fusion, stitching, etc. so as to obtain image data with higher quality.

In an optional embodiment, the processing unit may further process the image data, and performs lane line detection, obstacle detection, surrounding vehicle detection, pedestrian detection, traffic signal detection, signboard detection, etc. to obtain road traffic condition information. For example, obstacle detection may be performed to obtain an obstacle detection result, and the obstacle detection result is transmitted to a display apparatus for display or is transmitted to an alarm apparatus for alert.

Figure 2:
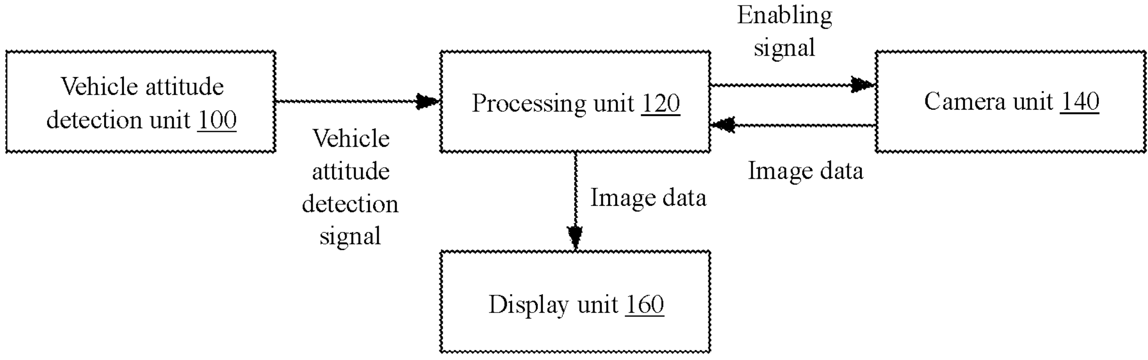
FIG. 2 is a structure block diagram of another optional driving assistance system according to an embodiment of the present disclosure.

FIG. 2 is a structure block diagram of another optional driving assistance system according to an embodiment of the present disclosure. Differing from the driving assistance system shown in FIG. 1, the processing unit 220 of the driving assistance system further includes a fourth interface and is configured to generate an enabling signal based on the vehicle attitude detection signal, send the enabling signal to the camera units through the fourth interface, control the camera units 140 to be enabled, and receive, through the second interface, the image data obtained by the camera units 140. It is worth noting that while it is described herein that the second interface and the fourth interface are responsible for sending the enabling signal and receiving the image data respectively, it is known to those skilled in the art that the sending the enabling signal and the receiving the image data may also be accomplished by sharing the same interface. In this embodiment, the vehicle attitude detection unit 100, the camera units 140, and the display unit 160 having the same functions or structures as those in the embodiment shown in FIG. 1 may be used, of which the description will not be repeated herein. Thus, only when a driving assistance function is needed, the corresponding camera unit is enabled, and the remaining camera units are kept disabled, such that the overall power consumption of the vehicle is reduced.

Similarly, the processing unit 220 is further configured to compare the vehicle attitude detection signal with a preset value, generate an enabling signal based on a comparison result, and receive the image data obtained by the camera units 140 corresponding to the vehicle attitude detection signal. For example, when the vehicle attitude detection signal represents that the vehicle is in the uphill driving state or the downhill driving state, if the vertical angle information in the vehicle attitude detection signal exceeds the preset value, the processing unit generates an enabling signal, sends the enabling signal to the front view camera on the front side of the vehicle, and controls the front view camera to be enabled to obtain an image in front of the vehicle. When the vehicle attitude detection signal represents that the vehicle is in the left turning state or the right turning state, if the horizontal angle information in the vehicle attitude detection signal exceeds the preset value, the processing unit generates an enabling signal, sends the enabling signal to the camera on the left side or the right side of the vehicle, and controls the camera to be enabled to obtain an image on the left side or the right side of the vehicle.

Figure 3:
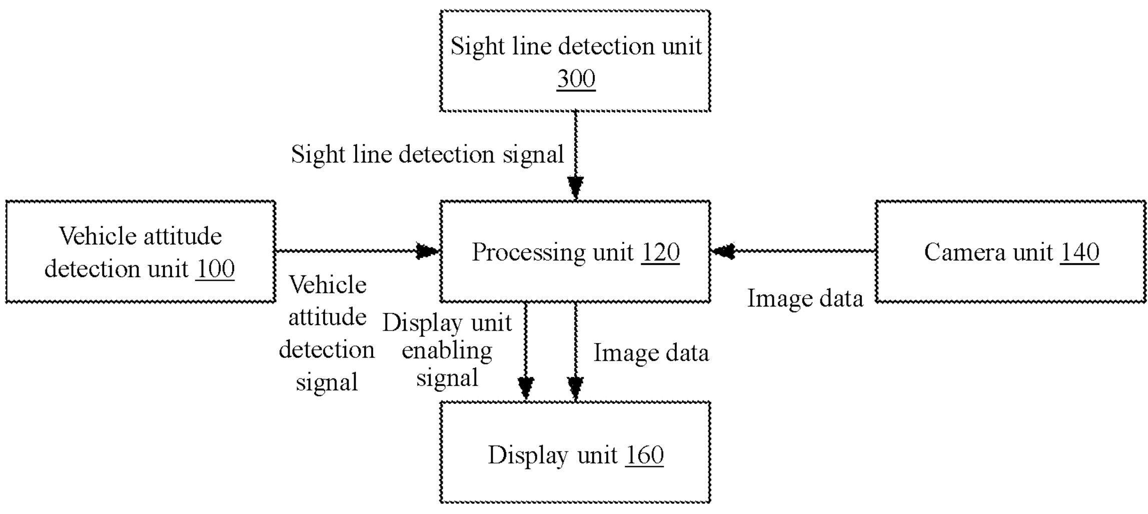
FIG. 3 is a structure block diagram of another optional driving assistance system according to an embodiment of the present disclosure.

FIG. 3 is a structure block diagram of another optional driving assistance system according to an embodiment of the present disclosure. Differing from the driving assistance system shown in FIG. 1, the driving assistance system further includes a sight line detection unit 300 configured to detect a sight line direction and/or a sight point position of a driver and obtain a sight line detection signal; and the processing unit 120 generates a display unit enabling signal based on the sight line detection signal and controls the corresponding display unit to be enabled. For example, when the sight line detection unit 300 detects that a sight point of the driver falls on a central control display screen, the processing unit 120 controls the central control display screen to be turned on to display the image data sent by the processing unit 120. When the sight line detection unit 300 detects that the sight point of the driver falls on a left A-pillar display screen, the processing unit 120 controls the left A-pillar display screen to be turned on to display the image data sent by the processing unit 120. In this embodiment, the vehicle attitude detection unit 100, the processing unit 120, the camera units 140, the display unit 160, and other components not described may have the same functions or structures as those in the embodiment shown in FIG. 1 or FIG. 2, of which the description will not be repeated herein. Thus, it is possible to turn on only the display unit of concern to the driver and turn off other display units of the vehicle, thereby reducing the overall power consumption of the vehicle and interference with the driver.

Figure 4:
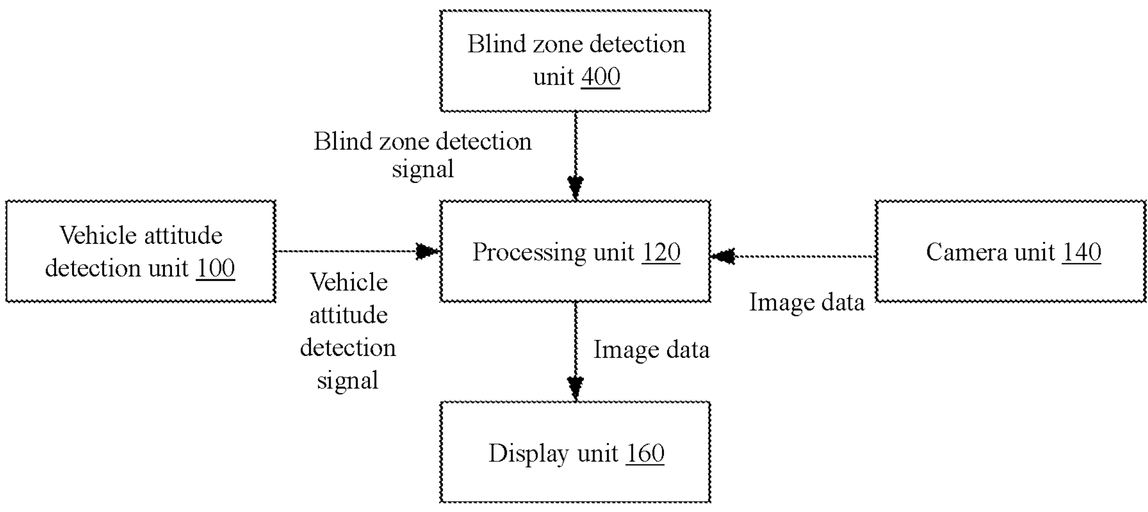
FIG. 4 is a structure block diagram of another optional driving assistance system according to an embodiment of the present disclosure.

FIG. 4 is a structure block diagram of another optional driving assistance system according to an embodiment of the present disclosure. Differing from the driving assistance system shown in FIG. 1, the driving assistance system further includes a blind zone detection unit 400 configured to determine a blind zone position of the vehicle in light of the vehicle attitude detection signal and obtain a blind zone detection signal; and the processing unit 120 determines the blind zone position based on the blind zone detection signal and receives, through the second interface, image data corresponding to the blind zone position and obtained by the camera units. In this embodiment, the vehicle attitude detection unit 100, the processing unit 120, the camera units 140, the display unit 160, and other components not described may have the same functions or structures as those in the embodiment shown in FIG. 1, FIG. 2, or FIG. 3, of which the description will not be repeated herein. Thus, it is possible to effectively obtain image data from the blind zone position and eliminate visual interference caused by images from unrelated positions, to improve the accuracy of driving safety assistance.

In an optional embodiment, the processing unit synthesizes image data obtained by the camera units in at least two adjacent positions to obtain image data with a larger field of view. For example, when the vehicle is in the left turning state or the right turning state, the processing unit may stitch the image data obtained by the camera unit on the left side or the right side with the image data obtained by the camera unit on the front side, and send the stitched image data to the display unit for display. The processing unit may also stitch the image data obtained by the camera units on the left side, the front side, and the right side, and send the stitched image data to the display unit for display. As another example, when the vehicle is in the reversing state, the processing unit may stitch the image data obtained by the camera unit on the left side or the right side with the image data obtained by the camera unit on the rear side, and send the stitched image data to the display unit for display. The processing unit may also stitch the image data obtained by the camera units on the left side, the right side, and the rear side, and send the stitched image data to the display unit for display.

Figure 5:
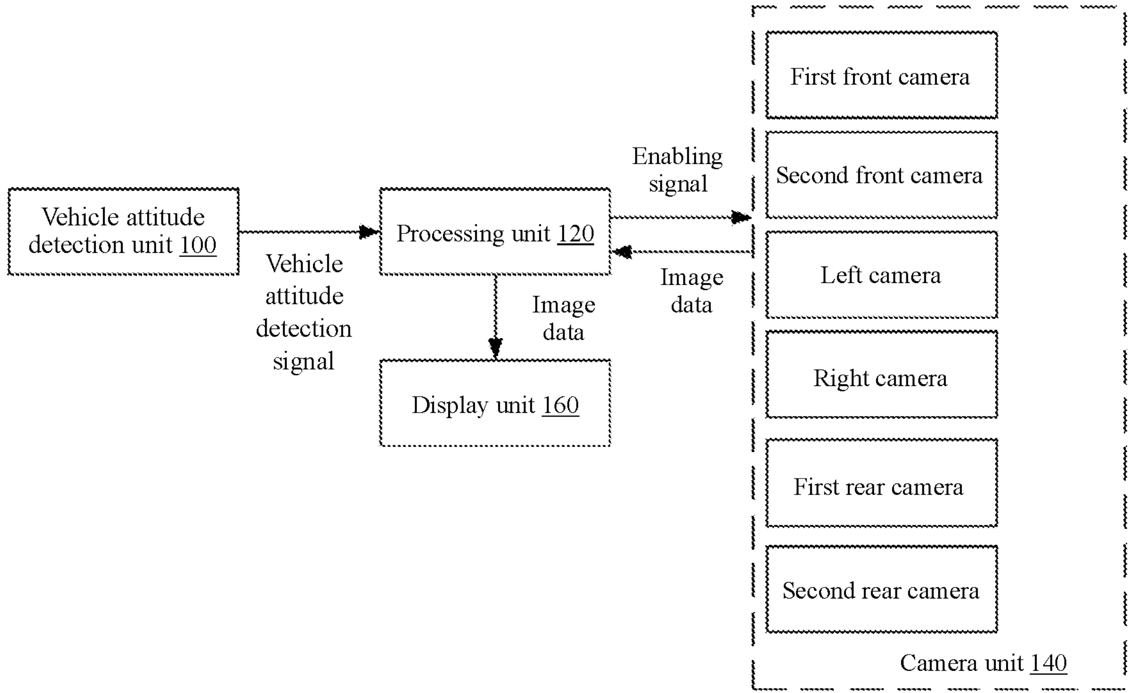
FIG. 5 is a structure block diagram of another optional driving assistance system according to an embodiment of the present disclosure.

FIG. 5 is a structure block diagram of an optional driving assistance system according to an embodiment of the present disclosure. In this embodiment, the camera unit 140 includes a first front camera, a second front camera, a left camera, a right camera, a first rear camera, and a second rear camera. The first front camera is mounted at a position for an ordinary around view monitoring (AVM) front camera close to and above the front license plate. The second front camera is mounted at a position inside the vehicle close to an upper central part of the windshield. The first rear camera is mounted at a position for an ordinary AVM rear camera close to and above the rear license plate. The second rear camera is mounted at the top of the trunk on the rear side of the vehicle or at the top of the rear window. When the vehicle is in the uphill driving state, images obtained by the first front camera and the second front camera may be stitched, and the stitched image data may be sent to the display unit for display. The images obtained by these two cameras may also be displayed directly on upper and lower parts of a screen according to an up-down corresponding relationship without being stitched. When the vehicle is in the reversing state, images obtained by the first rear camera and the second rear camera may be stitched, and the stitched image data may be sent to the display unit for display. The images obtained by the two cameras may also be displayed directly on upper and lower parts of a screen according to an up-down corresponding relationship without being stitched. AVM cameras only provide top-view images and cannot provide the user with a larger range of driving environment information. The user can be provided with a larger range of driving environment information through stitched or combined display of the images obtained by the AVM cameras and other cameras, to assist in safe driving.

In an optional embodiment, the vehicle attitude detection unit, the sight line detection unit, the blind zone detection unit, the processing unit, the camera units, and the display unit are discrete components, partially integrated components, or completely integrated components. For example, the processing unit and the vehicle attitude detection unit may be integrated into one component. As another example, the camera units and the vehicle attitude detection unit may be integrated into one component.

The ordinal numbers of the above embodiments of the present disclosure are only for the purpose of description and do not represent superiority or inferiority of the embodiments.

In the above embodiments of the present disclosure, the description of each embodiment has its own emphasis. For the part not detailed in an embodiment, reference may be made to related descriptions of other embodiments.

In the several embodiments provided in the present application, it should be understood that the technical content disclosed may be implemented in other ways. The device embodiment described above is merely schematic. For example, the division of units may be a logical functional division. In actual implementation, there may be other ways of division. For example, a plurality of units or components may be combined or integrated to another system, or some features may be ignored or not implemented. In addition, mutual coupling or direct coupling or communication connection shown or discussed may be indirect coupling or communication connection through certain interfaces, units, or modules, and may be in electrical or other forms.

Units described as separate components may or may not be physically separated, and components shown as units may or may not be physical units, that is, may be located in one place, or may be distributed to multiple units. Some or all of the units may be selected according to actual needs to achieve the objectives of the solutions in these embodiments.

In addition, each functional unit in each embodiment of the present disclosure may be integrated into one processing unit, each unit may be physically separate, or two or more units may be integrated into one unit. The above integrated unit may be implemented in the form of hardware or a software functional unit.

The integrated unit, if implemented in the form of the software functional unit and sold or used as a stand-alone product, may be stored in one computer-readable storage medium. Based on such understanding, essentially the technical solution of the present application, a part that makes a contribution over the prior art, or all or part of the technical solution may be embodied in the form of a software product, and the computer software product is stored in one storage medium and includes multiple instructions for making one computer device (which may be a personal computer, a server, or a network device) perform all or part of the steps of the method in each embodiment of the present disclosure. The foregoing storage medium includes a U disk, a read-only memory (ROM), a random access memory (RAM), a mobile hard disk, a magnetic disk, or a compact disc that may store program codes.

The above description is only the preferred implementation of the present disclosure. It should be pointed out that several improvements and modifications may be made by those of ordinary skill in the art without departing from the principle of the present disclosure, and these improvements and modifications are also regarded as the scope of protection of the present disclosure.

The invention claimed is:

1. A driving assistance system, comprising a vehicle attitude detection unit, camera units, a processing unit, and a display unit, wherein the vehicle attitude detection unit is configured to detect a driving state of a vehicle in real time after the vehicle is started and obtain a vehicle attitude detection signal;

the processing unit has a first interface, a second interface, and a third interface; the processing unit is connected to the vehicle attitude detection unit through the first interface and is configured to receive the vehicle attitude detection signal outputted by the vehicle attitude detection unit and receive, through the second interface, image data obtained by the camera units corresponding to the vehicle attitude detection signal; and the display unit is connected to the third interface of the processing unit and is configured to receive and display the image data, wherein the vehicle attitude detection signal comprises a vertical angle, and wherein, in response to a left- or right-turn driving state, the processing unit stitches side and front image data, and in response to a reversing state, stitches rear and side image data.

2. The driving assistance system according to claim 1, wherein the processing unit further comprises a fourth interface and is configured to generate an enabling signal based on the vehicle attitude detection signal, send the enabling signal to the camera units through the fourth interface, and control the camera units to be enabled.

3. The driving assistance system according to claim 1, wherein the driving assistance system further comprises a blind zone detection unit configured to determine a blind zone position of the vehicle in light of the vehicle attitude detection signal and obtain a blind zone detection signal; and the processing unit determines the blind zone position based on the blind zone detection signal and receives, through the second interface, image data corresponding to the blind zone position and obtained by the camera units.

4. The driving assistance system according to claim 1, wherein the vehicle attitude detection signal further comprises at least one of: a horizontal angle or a driving speed of the vehicle.

5. The driving assistance system according to claim 1, wherein the processing unit is further configured to compare the vehicle attitude detection signal with a preset value and receive the image data obtained by the camera units corresponding to the vehicle attitude detection signal based on a comparison result.

6. The driving assistance system according to claim 1, wherein the vehicle attitude detection unit, the processing unit, the camera units, and the display unit are discrete components, partially integrated components, or completely integrated components.

7. The driving assistance system according to claim 1, wherein the processing unit further renders the image data and sends the processed image data to the display unit through the third interface for display.

8. The driving assistance system according to claim 1, wherein the camera units are located on at least one of following positions of the vehicle: a front side, a rear side, a left side, or a right side.

9. The driving assistance system according to claim 1, wherein the processing unit synthesizes image data obtained by the camera units in at least two adjacent positions.

10. The driving assistance system according to claim 1, wherein the vehicle attitude detection signal represents at least one of following driving states of the vehicle: straight driving, uphill driving, downhill driving, left turning, right turning, reversing, or parked.

11. The driving assistance system according to claim 1, wherein the driving assistance system further comprises a sight line detection unit configured to detect a sight line direction and/or a sight point position of a driver and obtain a sight line detection signal; and the processing unit generates a display unit enabling signal based on the sight line detection signal and controls the display unit to be enabled.

12. The driving assistance system according to claim 1, wherein the vehicle attitude detection unit comprises at least one of: an inertial sensor, a camera, an infrared sensor, a radar, a laser radar, or a GPS.

13. The driving assistance system according to claim 12, wherein the inertial sensor comprises a three-axis gyroscope, a three-axis accelerometer, and a three-axis magnetometer.

14. The driving assistance system according to claim 1, wherein the processing unit detects an obstacle in the image data to obtain an obstacle detection result.

15. The driving assistance system according to claim 14, wherein the obstacle detection result is transmitted to the display unit for display or is transmitted to an alarm apparatus for alert.

16. The driving assistance system according to claim 1, wherein content displayed by the display unit contains a distance and a direction indication.

17. The driving assistance system according to claim 1, wherein a number of the camera units is at least four, such that environmental images covering a periphery of the vehicle can be obtained when enabling all the camera units.

18. The driving assistance system according to claim 1, wherein a field of view of the camera units is greater than or equal to 180 degrees.

19. A vehicle, comprising the driving assistance system according to claim 1.

20. The driving assistance system according to claim 1, wherein when vertical angle information in the vehicle attitude detection signal exceeds a preset value in an uphill driving state or a downhill driving state, the processing unit obtains an image in front of the vehicle.

* * * * *